US008667623B2

(12) United States Patent
Paget

(10) Patent No.: US 8,667,623 B2
(45) Date of Patent: Mar. 11, 2014

(54) SHOWER HEAD WITH REFLECTIVE ANTI-FOGGING SURFACE

(75) Inventor: Nicholas G. Paget, San Francisco, CA (US)

(73) Assignee: Clifson Limited (GB)

(*) Notice: Subject to any disclaimer, the term of this patent is extended or adjusted under 35 U.S.C. 154(b) by 715 days.

(21) Appl. No.: 12/905,053

(22) Filed: Oct. 14, 2010

(65) Prior Publication Data

US 2011/0089259 A1 Apr. 21, 2011

Related U.S. Application Data

(60) Provisional application No. 61/279,284, filed on Oct. 15, 2009.

(51) Int. Cl.

| | |
|---|---|
| ***A47K 3/022*** | (2006.01) |
| ***A47K 3/28*** | (2006.01) |
| ***B05B 15/00*** | (2006.01) |
| ***B05B 17/00*** | (2006.01) |
| ***G02B 7/18*** | (2006.01) |

(52) U.S. Cl.

USPC .................. 4/605; 4/597; 239/289; 239/556; 359/512; 248/476

(58) Field of Classification Search

USPC ............. 239/289, 548, 556; 4/597, 605, 615; 359/509, 512, 514; 248/466, 475.1, 248/476

See application file for complete search history.

(56) References Cited

U.S. PATENT DOCUMENTS

| | | | | |
|---|---|---|---|---|
| 4,556,298 | A * | 12/1985 | Gottlieb | 359/512 |
| 4,557,003 | A * | 12/1985 | Jones | 4/605 |
| 4,832,475 | A | 5/1989 | Daniels | |
| 5,032,015 | A * | 7/1991 | Christianson | 359/512 |
| 5,847,873 | A * | 12/1998 | Kim | 359/512 |
| 5,953,157 | A * | 9/1999 | Christianson | 359/509 |
| 6,799,335 | B1 * | 10/2004 | Zadro | 4/605 |
| 7,657,948 | B2 * | 2/2010 | Tsai | 4/615 |
| 2005/0195481 | A1 * | 9/2005 | Jui | 359/512 |
| 2008/0295242 | A1 | 12/2008 | Tsai | |

FOREIGN PATENT DOCUMENTS

WO WO2011047212 4/2011

OTHER PUBLICATIONS

International Search Report, PCT application US2010/052759, dated Dec. 10, 2010, 1 page.

* cited by examiner

*Primary Examiner* — Ryan Reis

(74) *Attorney, Agent, or Firm* — Craige Thompson; Thompson Patent Law

(57) ABSTRACT

Various apparatus and methods involve a showerhead that directs a stream of fluid through a portion of a cavity in a direct heat transfer relationship with a reflective surface prior to directing a stream out of the cavity and through a plurality of apertures toward a user. In an illustrative example, the user may view an image on the reflective surface while being sprayed with the plurality of streams in a steam filled environment. In some examples, the showerhead may include an inlet configured to direct the fluid toward the reflective surface as it enters the cavity. In some examples, the showerhead may operate to substantially reduce or prevent condensation from forming on the reflective surface by promoting heat transfer from the fluid to the reflective surface.

20 Claims, 12 Drawing Sheets

SHOWER HEAD WITH REFLECTIVE ANTI-FOGGING SURFACE

CROSS REFERENCE TO RELATED APPLICATIONS

This application claims the benefit of U.S. Provisional Patent Application entitled "Showerhead with Reflective Anti-fogging Surface," Ser. No. 61/279,284, which was filed by Nicholas G. Paget on Oct. 15, 2009, the entire contents of which are incorporated herein by reference.

TECHNICAL FIELD

Various embodiments relate generally to showerheads with reflective anti-fogging surfaces.

BACKGROUND

Grooming, particularly shaving, in a shower is a well-established activity for both men and women because of the known benefits of the steam filled environment and the ready source of warm water for washing and rinsing cosmetics. Using a mirror in a shower makes both grooming and shaving more convenient and safe. However, mirrors placed in a steam filled environment, such as a shower enclosure, may tend to fog up due to condensation, which can obscure a reflected image.

SUMMARY

Various apparatus and methods involve a showerhead that directs a stream of fluid through a portion of a cavity in a direct heat transfer relationship with a reflective surface prior to directing a stream out of the cavity and through a plurality of apertures toward a user. In an illustrative example, the user may view an image on the reflective surface while being sprayed with the plurality of streams in a steam filled environment. In some examples, the showerhead may include an inlet configured to direct the fluid toward the reflective surface as it enters the cavity. In some examples, the showerhead may operate to substantially reduce or prevent condensation from forming on the reflective surface by promoting heat transfer from the fluid to the reflective surface.

Certain embodiments of a showerhead apparatus may achieve one or more advantages. For example, some implementations may reduce condensation on the image region by directing the fluid first toward the image region to maximize heat transfer to this region. Various embodiments may be configured to conserve water by employing the entire fluid stream both (i) to provide condensation-reducing heat transfer in the image region, and (ii) to provide effective spray streams directed toward the user. Some embodiments may combine an image region for a user to view their reflection and aperture region on the exterior surface of a showerhead apparatus' faceplate to avoid extra structures, excessive pipes, and external devices. Some embodiments may include a connection element (e.g., swivel ball) that may be angularly directed by user manipulation, or released into a wand-connected had-held mode that can be positioned manually to locate and/or orient the image with respect to the user while being sprayed from the showerhead.

Certain embodiments may substantially prevent condensation from forming on an image region of the showerhead apparatus in a steam filled area by providing heat transfer from heated fluid to the image region. In some implementations, the showerhead apparatus may be configured such that fluid within the cavity makes thermal contact with the image region before making contact with the aperture. In some examples, the cavity may be provided with a baffle or the inlet port may be positioned to direct fluid toward the image region. In other examples, the cross sectional area of the apertures in the aperture region may be less than the cross section area of the inlet port for a greater fluid flow rate into the cavity than out of the cavity to ensure that the cavity fills with fluid. In other examples, the thickness of the exterior and interior surfaces of the faceplate may be minimized so heat is transferred from the fluid to the image region more quickly.

Some embodiments may provide a larger image region so a user can see more of their image. Some embodiments may provide an adjustable faceplate, image region, and/or aperture region. In some implementations, the faceplate orientation may be adjustable by a mounting fixture so a user may adjust the viewing angles of the image region and control the fluid flow of the aperture region. In some examples, the aperture region may be adjustable without adjusting the image region to control the spray of fluid without changing the viewing angle.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

In the depicted figures, a showerhead apparatus is configured to function as a showerhead that provides streams of fluid and a non-fogging reflective surface for a user to view their reflection in a steam filled environment.

Figure 1:
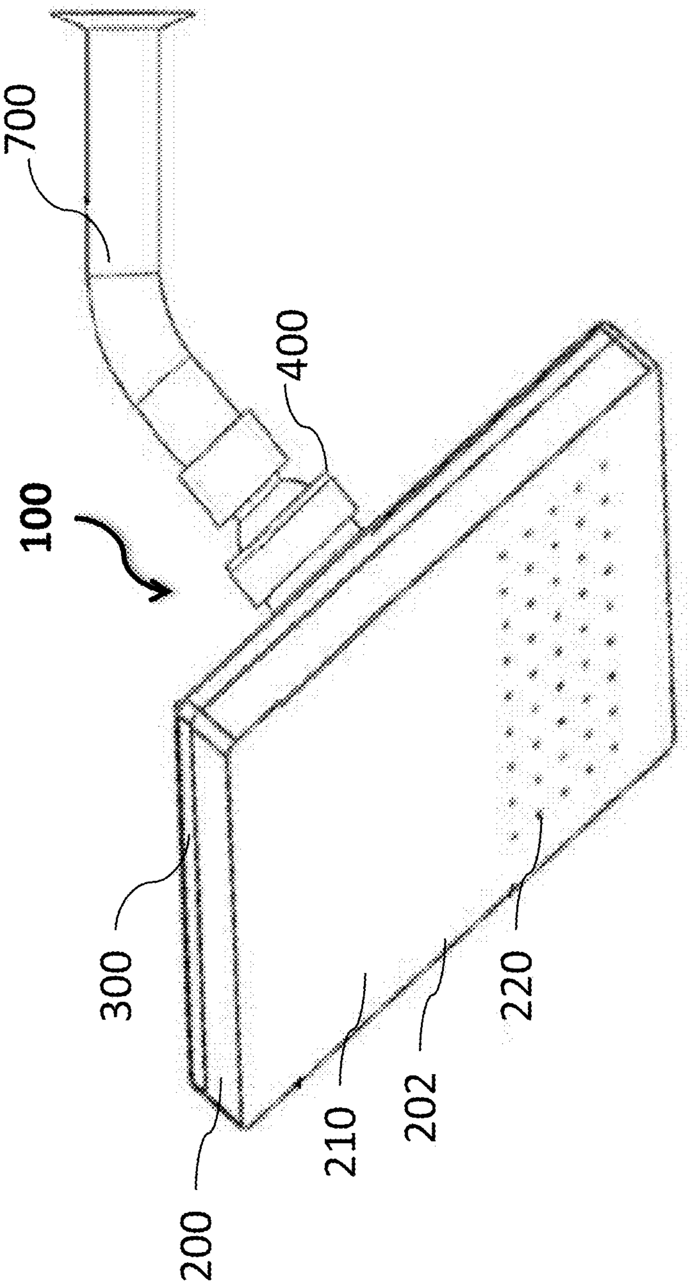
FIG. 1 shows a perspective view of an exemplary showerhead apparatus connected to a shower arm.

FIG. 1 shows a perspective view of an exemplary showerhead apparatus connected to a shower arm. As depicted, a showerhead apparatus 100 includes a face plate 200, a rear plate 300, and a mounting fixture 400 for connecting the showerhead apparatus to the shower arm 700 via a rear plate

300. The mounting fixture 400 may be an adjustable fixture that allows movement of the showerhead apparatus 100 relative to the shower arm 700. The shower arm 700 is in communication with a source of pressurized fluid (not shown) via plumbing to supply fluid to the showerhead apparatus.

The face plate 200 includes an image region 210 and an aperture region 220 on its exterior surface 202. The image region 210 may provide a substantially reflective surface. In this embodiment, the image region 210 lacks apertures.

The aperture region 220 includes a plurality of apertures for forming a corresponding plurality of fluid streams directed toward a user whose image may be simultaneously reflected by the image region 210. For example, each of the plurality of apertures may form a fluid stream when the showerhead apparatus is supplied with fluid from a pressurized source of fluid.

During operation, a pressurized source of fluid may be supplied to the apparatus 100. In various embodiments, the image region 210 is thermally responsive to the supplied fluid. In an illustrative example, the temperature of a surface 202 in the image region 210 may be initially at an ambient temperature prior to operation. During operation, the fluid may be introduced to the apparatus 100 at a temperature substantially above the initial temperature of the image region 210. As the fluid is directed toward an interior surface of the image region 210, the temperature of an exterior surface of the image region 210 may increase toward a temperature of the fluid entering the showerhead 100. As heat is transferred from the fluid to the image region 210, the fluid temperature may be reduced. As the fluid is directed through the apertures in the aperture region 220, the temperature of the fluid may be substantially at or below the average temperature on the exterior surface of the image region 210. Accordingly, any condensation present on the exterior surface of the image region 210 may evaporate, and further condensation may be substantially avoided.

Figure 2:
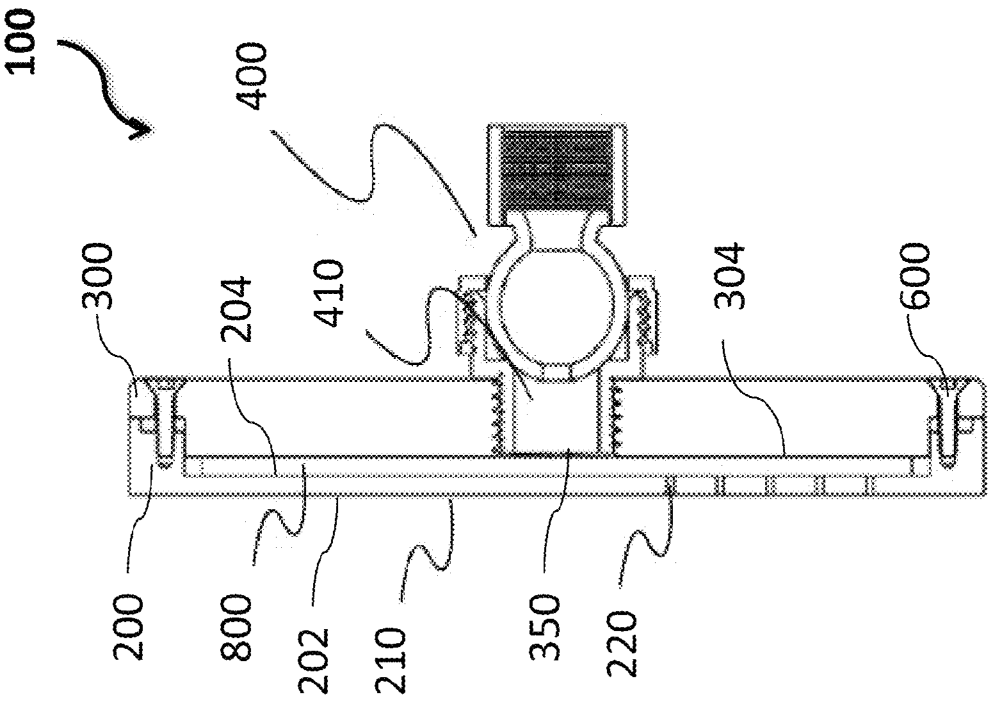
FIG. 2 shows a cross-sectional view of the exemplary showerhead apparatus of FIG. 1.

FIG. 2 shows a cross-sectional view of the exemplary showerhead apparatus of FIG. 1. The face plate 200 and the rear plate 300 are attached together by screws 600 to form a housing defining a substantially enclosed cavity 800. The walls of the cavity 800 are defined by the interior surface 204 of the face plate 200 and the interior surface 304 of the rear plate 300. The mounting fixture 400 forms an inlet port 410 into the cavity 800 via an aperture 350 in the rear plate 300. When supplied with fluid, the cavity 800 of the showerhead apparatus receives fluid through the inlet port 410 and eventually exits the cavity 800 through the apertures of the aperture region 220.

The cavity 800 is designed to be a heat transfer chamber that provides thermal energy transfer between the supplied fluid and the face plate 200. Since the supplied fluid is generally higher in temperature than the ambient temperature exterior to the showerhead apparatus 100, heat is transferred from the supplied fluid to the face plate 200. The image region 210 is heated by the supplied fluid since the exterior surface 202 of the face plate 200 is in thermal contact with the fluid in the cavity 800 and the exterior surface 202 of the face plate 200 is in a heat conducting relationship with the interior surface 204 of the face plate 200. In some implementations, the exterior surface 202 of the face plate 200 may be substantially heated to approximately the same temperature as the incoming fluid temperature as soon as fluid flow is activated. Advantageously, condensation may not have adequate time to form on the image region 210 and any condensation that does form may substantially evaporate when the exterior surface 202 of the face plate reaches the temperature of the steam that fills the shower enclosure.

To promote heat transfer efficiency from the heated fluid to the image region 210, fluid flow to the image region 210 may be substantially continuous. Continuous contact may be provided, for example, by configuring the showerhead 100 such that during operation the cavity 800 is substantially full of fluid most of the time. Heat transfer efficiency to the image region 210 may be further promoted, for example, by configuring the flow path in the cavity 800 to direct the fluid flow to contact the image region 210 before contacting the aperture region 220. The thickness or distance between the exterior surface 202 and the interior surface 204 of the face plate 200 can be minimized to encourage more rapid heat transfer between the surfaces.

In some embodiments, the combined cross sectional area of all the apertures in the aperture region 220 may be less than the cross sectional area of the inlet port 410 so that the rate at which fluid enters the cavity 800 is greater than the rate at which fluid exits the cavity 800 through apertures in the aperture region 220. In various embodiments, this may promote the fluid to fill the cavity 800 and remain continuously in substantial thermal contact with the image region 210 during steady-state, high flow rate operation.

In some embodiments, the aperture 350 may be positioned to direct fluid flow coming from the pressurized source toward a portion of the image region 210 when the face plate 200 and rear plate 300 are attached so that supplied fluid makes contact with the image region 210 before making contact with the aperture region 220.

Figure 3:
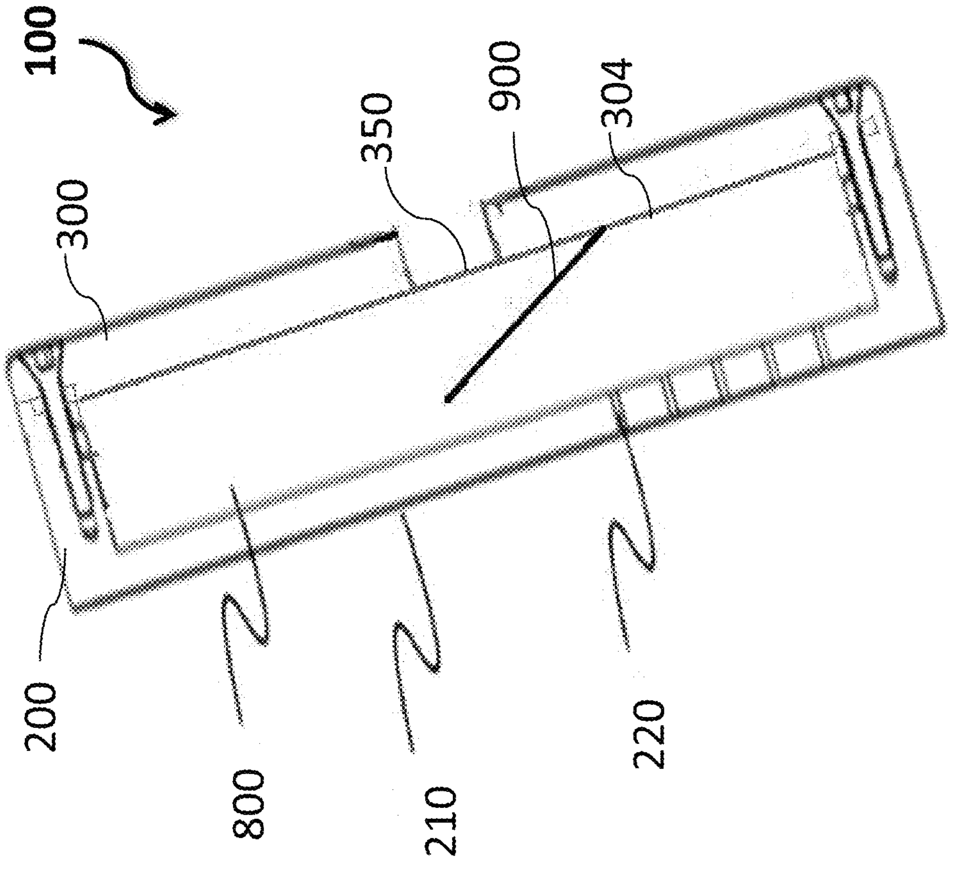
FIG. 3 shows an exemplary showerhead apparatus with a baffle to direct fluid flow toward an image region.

FIG. 3 shows an exemplary showerhead apparatus with a baffle to direct fluid flow toward an image region. As depicted in FIG. 3, a baffle 900 may be positioned within the cavity 800 to direct the flow of fluid toward a portion of the interior surface that corresponds with the image region 210. In some embodiments, the aperture 350 in the rear plate 300 and the corresponding inlet port 410 of the mounting fixture 400 may be attached at an angle with respect to the rear plate 300 such that fluid flow enters the cavity directed toward the image region 210. In the depicted embodiment, the baffle 900 has a linear cross-section. In some other embodiments, the baffle 900 may be formed as a circular disc-shaped arrangement in register with the aperture 350, and including at least one opening to permit the fluid to flow toward the portion of the cavity 800 that is adjacent the image region 210.

In some embodiments, the thickness or distance between the interior surface 204 and exterior surface 202 of the face plate 200 may be optimized, taking into account that apertures in the aperture region 220 require a certain thickness to spray exiting fluid with desired force. The thickness of the face plate 200 (e.g., in the image region 210) may directly affect the thermal response rate at which the exterior surface 202 heats up in response to the fluid in the cavity 800. Reduced thickness of the face plate 200 may promote more rapid heat transfer. In an illustrative embodiment, the thickness of the face plate 200 in the image region 210 may be about 0.125 inches. The range of thickness between the interior surface 204 and exterior surface 202 may be from about 0.0625 inches to about 0.5 inches, particularly from about 0.08 inches to about 0.25 inches, or from about 0.1 inches to about 0.2 inches, for example.

In some examples, the face plate 200 may have a substantially different thickness in the aperture region 220 relative to the thickness in the image region 210. For example, the ratio of a thickness of the face plate 200 in the image region 210 to a thickness of the face plate 200 in the aperture region 220 may be about 0.2, 0.25, 0.3, 0.4, 0.5, 0.6, 0.7, 0.8, 0.9, or about 0.95 to 1. A reduced thickness in the image region 210 may yield improved heat transfer to mitigate condensation, while advantageously providing a suitable lumen length for the apertures. In various examples, longer apertures may achieve better directionality of the stream passing through the lumen, for example. In some examples, a thicker face plate 200 in the aperture region 220 may permit formation of nozzle shapes (e.g., conical sections) in the exterior of at least some apertures, for example, to control back pressure, flow rate, and/or shape of the output stream.

Figure 4:
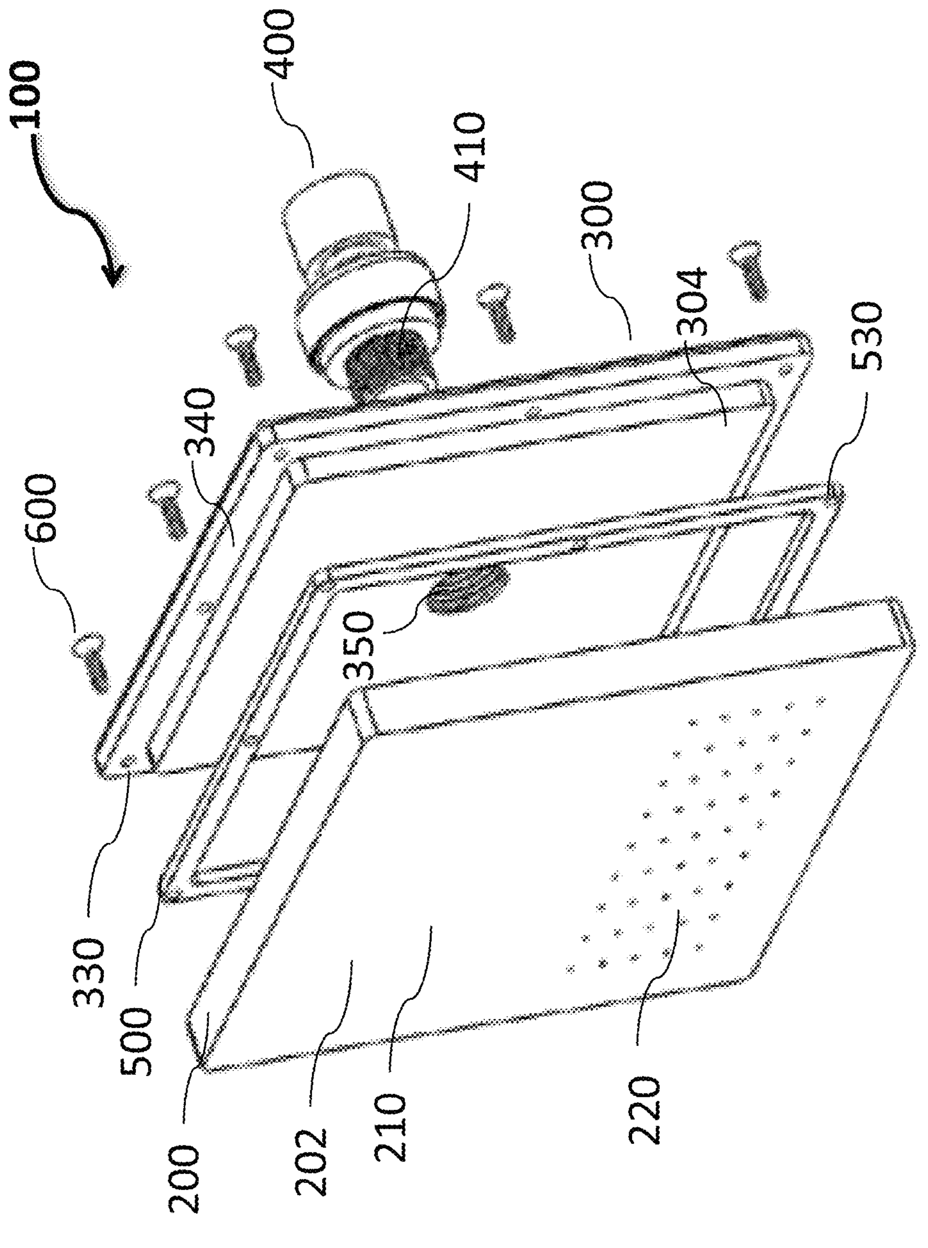
FIGS. 4-5 show exploded assembly views of the exemplary showerhead apparatus of FIG. 1.
Figure 5:
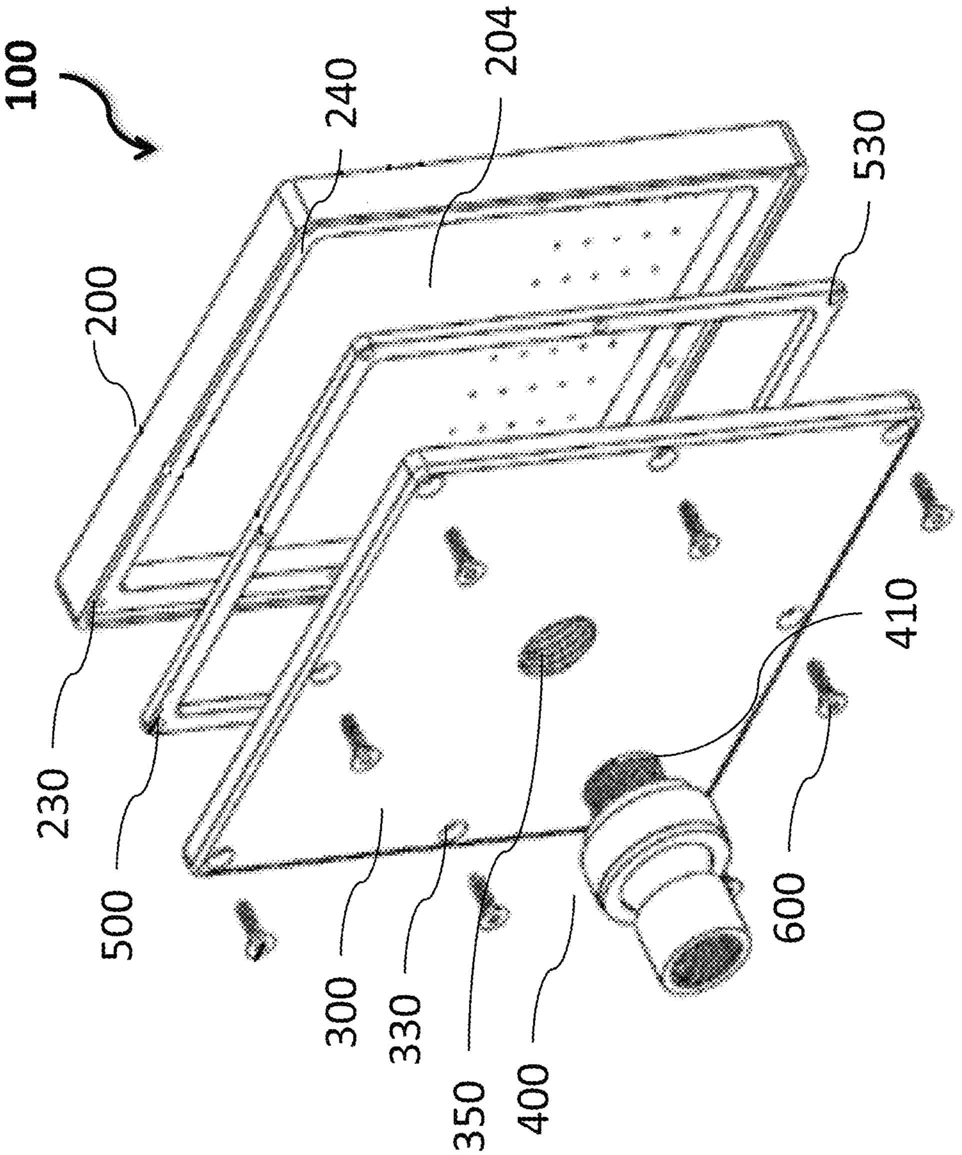

FIGS. 4-5 show exploded assembly views of the exemplary showerhead apparatus of FIG. 1.

In the depicted examples, the showerhead apparatus 100 includes a sealing member 500, such as a gasket, that fills the space between the mating surfaces of the face plate 200 and the rear plate 300. As mating surfaces, the face plate 200 (as depicted in FIG. 5) includes a frame 240 and the rear plate 300 includes a flange 340 (as depicted in FIG. 4). The sealing member 500 generally prevents leakage of fluid from the cavity 800 when the showerhead apparatus 100 is supplied with fluid. By preventing leakage, the sealing member 500 advantageously conserves water while providing showering and image reflection-functions to a user.

The face plate 200, sealing member 500, and rear plate 300 are fastened together by screws 600. Each of the face plate 200, sealing member 500, and rear plate 300 includes a set of peripheral apertures, including but not limited to apertures 230, 530, and 330, respectively. Each set of apertures 230, 530, and 330 align with each other to form a passageway through which screws 600 pass to fasten the face plate 200, sealing member 500, and rear plate 300 together forming a substantially water-tight cavity 800.

In some embodiments, the face plate 200 and rear plate 300 may be made from aluminum, such as machined aluminum. Other suitable materials may include chrome, nickel, brass copper, silver, bronze, gold, platinum, glass, and poly(methyl methacrylate) (PMMA), such as PLEXIGLAS®. The face plate 200 and the rear plate 300 may be made from the same or different materials or compositions of materials. The exterior surface 202 and interior surface 204 of the face plate 200 may be formed from the same or different materials. In some embodiments, the interior surface 204 may be formed from a material that is different from the exterior surface 202. The interior surface 204 may be formed from a material of higher thermal conductivity than the exterior surface 202 to increase heat conductance from the interior surface 204 to the exterior surface 202 of the face plate 200. For example, the face plate 200 may be formed from a metal, such as copper, platinum, and gold, and the exterior surface 202 of the face plate 200 may be coated with a reflective material, such as aluminum. In some embodiments, the image region 210 and/or other portions of the face plate 200 or the rear plate 300 may include chrome plated brass and/or stainless steel.

The reflective surface of the image region 210 on the exterior surface 202 of the face plate 200 may be formed from the same materials used for forming the face plate 200 and rear plate 300 as listed above. The image region 210 may be a coating on the face plate 200. For example, the image region 210 may be formed by subjecting the exterior surface 202 of the face plate 200 to either an electroless nickel or chrome plating process. These plating processes may give the exterior surface 202 of the face plate 200 a reflective surface finish. The entire or a portion, such as the non-apertured area, of the front surface of the face plate 200 may be coated. In other embodiments, the image region 210 may be formed by making the entire face plate 200 out of a reflective material.

In some examples, the face plate 200 and the rear plate 300 may have a square cross section with outside dimensions of about six inches in length by about six inches in width by about one-half inch in thickness. The thickness between the interior surface 204 and exterior surface 202 of the face plate 200 may be about 0.125 inches, for example. The flange 340 of the rear plate 300 may have a thickness of about 0.25 inches. The interior surface 304 of the rear plate 300 that forms the cavity 800 may have a square cross section with dimensions of about 5.23 inches in length by about 5.23 inches in width. The thickness between the interior surface 304 and flange 340 may be about 0.25 inches. The cavity 800 may have a range in thickness from about 0.125 inches to about 0.375 inches.

The sealing member 500 may be made from ⅛ inch neoprene. The sealing member 500 may have some degree of deformability to tightly fill in spaces that might have slight irregularities. Other suitable materials for forming the sealing member 500 includes gasket paper, rubber, silicone, metal, cork, felt, nitrile rubber, fiberglass, or a plastic polymer, such as polychlorotrifluoroethylene.

The face plate 200, rear plate 300, and sealing member 500 may be fastened together by screws. A set 530 of eight apertures may be punched through the sealing member 500. The apertures 530 may have a diameter of about 0.150 inches. The apertures 530 may be spaced apart from each other along the sealing member 500 by 2.25 inches. The number and dimensions of the set of apertures 230 in the face plate 200 and the set of apertures 330 in the rear plate may be the same as the set of apertures 530 in the sealing member 500. Other attachment methods may include fabrication processes to form an integral housing and snap fit connections. The attachment may be permanent.

By way of example and not limitation, the image region 210 may take up about two-thirds of the exterior surface 202 in the upper portion of the face plate 200, yielding dimensions of about four inches in length and about six inches in width. The aperture region 220 may include a plurality of apertures arranged in five rows by nine columns. Each aperture may have a diameter of about 0.1265 inches. The apertures in a row may be equally spaced at about 0.55 inches. The apertures in a column may be equally spaced about 0.35 inches. The apertures in the aperture region 220 may be angled to provide selected directional spray streams that can be non-orthogonal to the surface of the aperture region 220. In some embodiments, rubber inserts may be installed in the apertures. For example, to reduce calcium deposition.

The face plate 200 and rear plate 300 may have a different cross sectional shape, configurations, or geometries, such as non-square rectangle, triangle, star, or ellipse. The face plate 200 and rear plate 300 may have different dimensions from each other. The face plate 200 and rear plate 300 may have different outside and inside dimensions. The image region 210 may have different dimensions and positions on the face plate 200. The apertures of the aperture region 220 may have a different arrangement, spacing, and positions on the face plate 200. In some embodiments, the apertures may not be equally spaced. The aperture region 220 may have a different position on the face plate 200 relative to the position of the image region 210.

Figure 6:
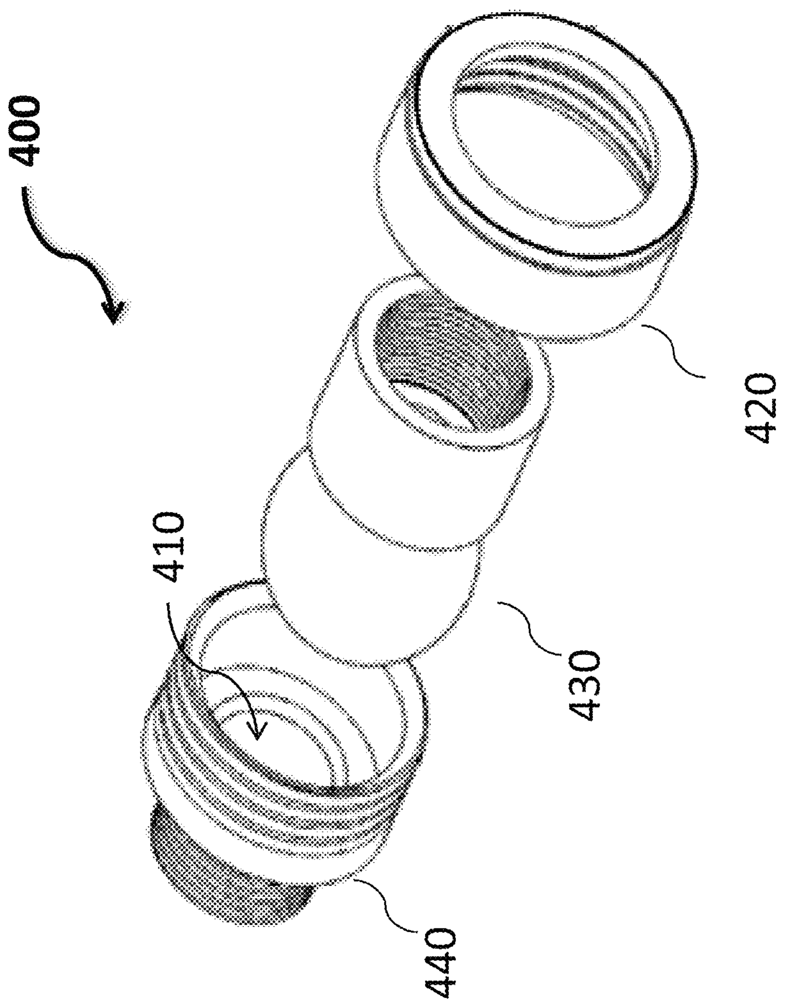
FIG. 6 shows a perspective view of a mounting fixture for connecting a showerhead apparatus to a shower arm.

FIG. 6 shows a perspective view of a mounting fixture for connecting a showerhead apparatus to a shower arm. The mounting fixture 400 includes a fitting 420 for threaded engagement with the shower arm 700 (as depicted in FIG. 1), a tubular body 440 with a nose portion for threaded engagement with aperture 350 in the rear plate 300, and a swivel 430. The swivel 430 may be in the form of a ball and socket type connection for interconnecting the fitting 420 and the tubular body 440 to permit a range of relative movement of a universal nature. In some embodiments, the swivel ball assembly may include a flow restrictor. Suitable swivels are commercially available, for example, as part number 205.995.110 from Opella LLC of Florida.

The mounting fixture 400 may allow adjustment of the face plate 200 orientation so a user can view their reflection at the desired viewing angle or control the position of the streams of fluid exiting through the apertures of the aperture region 220. In a ball and socket type swivel, the ball can freely rotate inside a socket to allow movement of the face plate 200.

Figure 7:
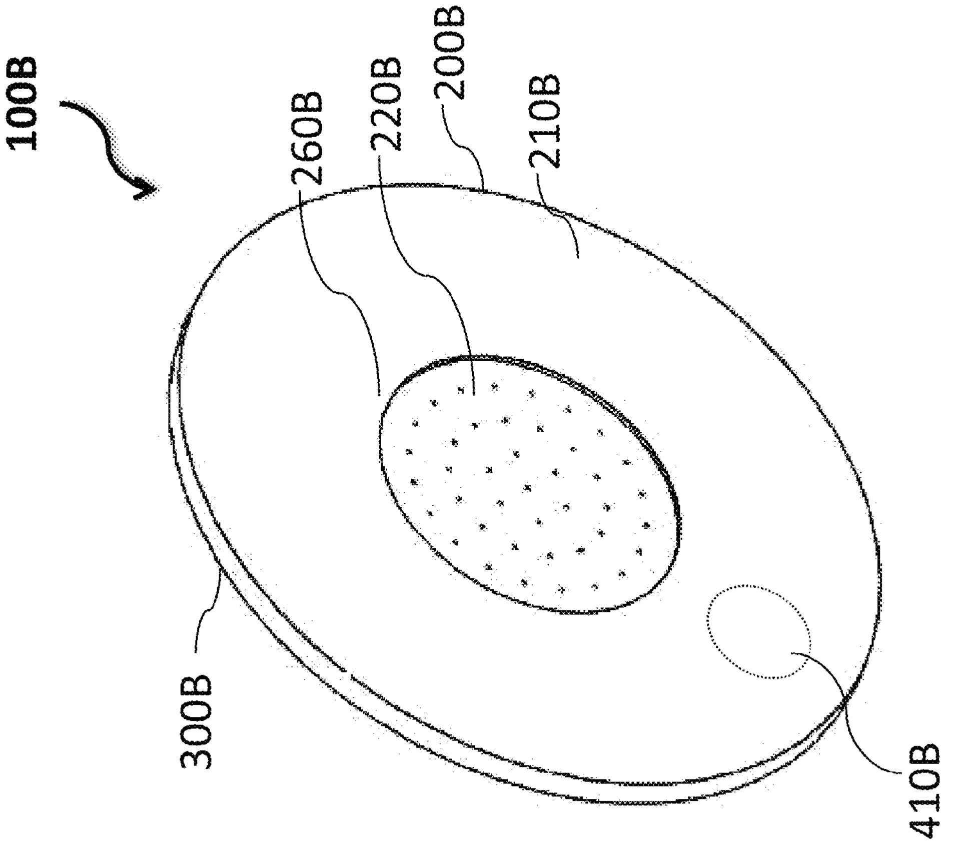
FIG. 7 shows an exemplary showerhead apparatus with circular geometry.

FIG. 7 shows an exemplary showerhead apparatus with circular geometry. The showerhead apparatus 100B includes a face plate 200B attached to a rear plate 300B that forms a housing defining a substantially enclosed annular cavity. The face plate 200B includes an image region 210B and an aperture region 220B. The exterior and interior surfaces of the face plate 200B corresponding to the image region 210B define the walls of the annular cavity. The image region 210B is an annular ring that surrounds the aperture region 220B. The thickness of the aperture region 220B is substantially similar to the thickness of the housing, which defines the annular shape of the cavity behind the image region 210B. At least one edge of the aperture region 220B has an aperture defining a conduit 260B into the aperture region 220B. The rear plate 300B has an aperture through which an inlet port 410B may access the annular cavity.

When fluid is supplied through the inlet port 410B, the annular cavity fills with the fluid and eventually exits the apertures of the aperture region 220B when the fluid enters the conduit 260B. The fluid travels through the annular cavity before entering the aperture region 220B. Thus, heat transfer that occurs from the heated fluid to the annular image region 210B is at high efficiency and prevents condensation on the image region 210B.

Figure 8:
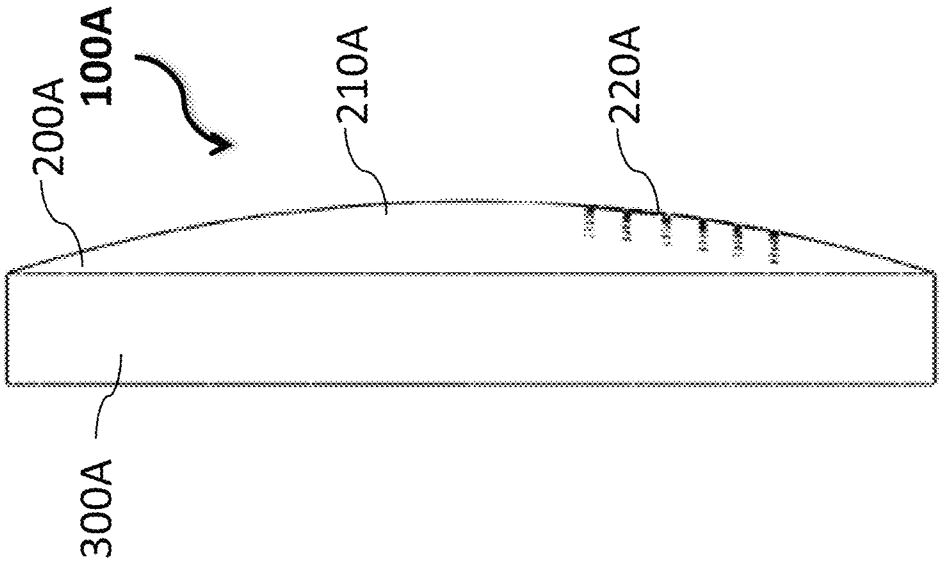
FIG. 8 shows an exemplary showerhead apparatus in which the exterior surface of the face plate has a convex curvature.

FIG. 8 shows an exemplary showerhead apparatus in which the exterior surface of the face plate has a convex curvature. Convex is characterized as bulging outward. The showerhead apparatus 100A includes a face plate 200A with an exterior surface that has a convex curvature and rear plate 300A. The face plate 200A includes an image region 210A and an aperture region 220A. The reflective surface of the image region 210A bulges toward a light source and reflects light outward instead of focusing light. This effect allows a user to see behind them if desired.

In some embodiments, an exemplary showerhead apparatus includes a face plate with an exterior surface that has a concave curvature. Concave is characterized as bulging substantially inward. An image region with a concave reflective surface reflects light inward to one focal point. The focal length is the distance between the focal point and the center of the exterior surface of the face plate. When the distance between a user and the center of the face plate's exterior surface is less than the focal length of the image region, the user's reflection may become magnified. This can be particularly useful for users with impaired eyesight trying to view their reflections in a steam-filled environment, for example.

Figure 9:
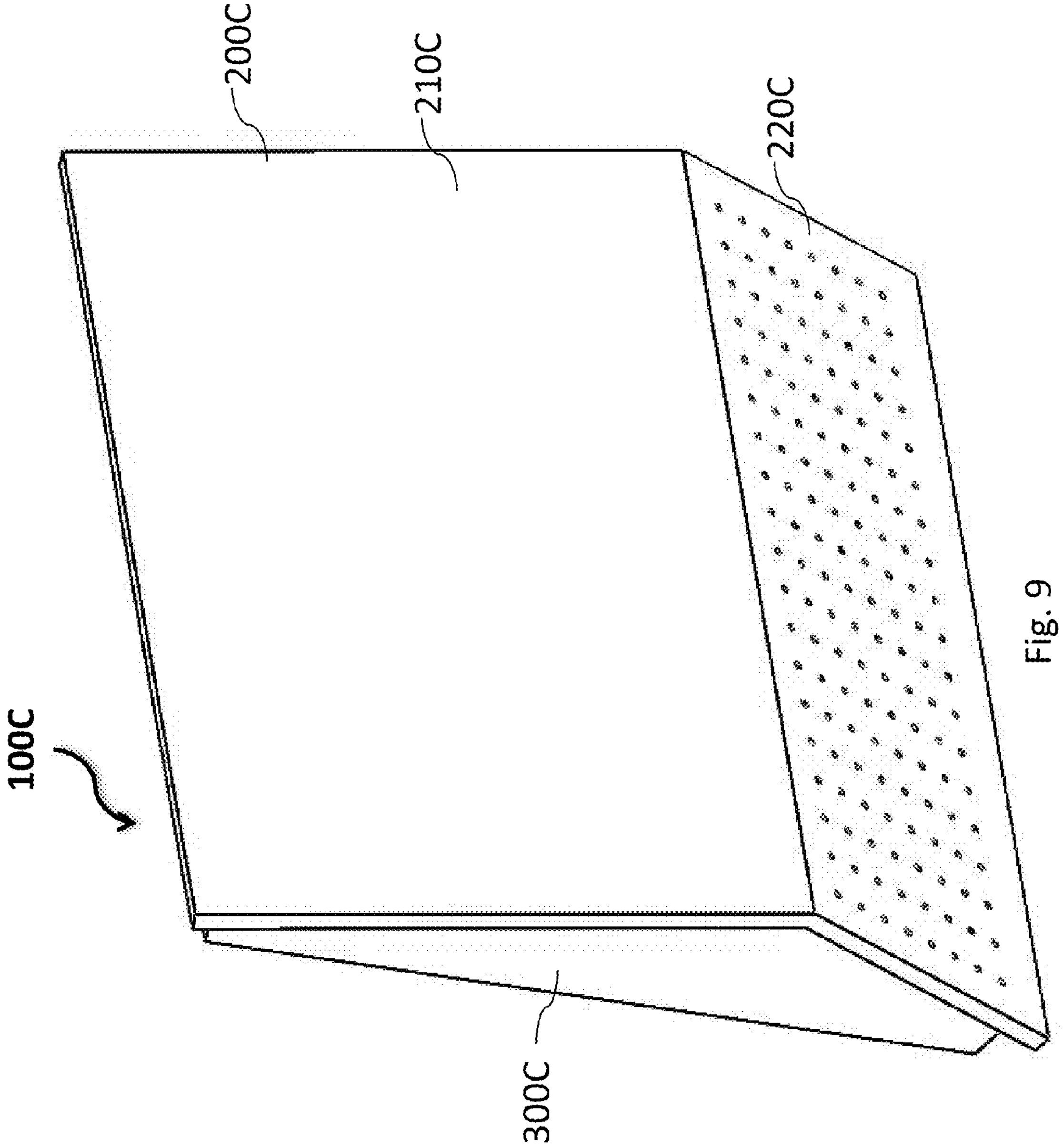
FIG. 9 shows an exemplary showerhead apparatus with an angled or bent exterior surface.

FIG. 9 shows an exemplary showerhead apparatus with an angled or bent exterior surface. The showerhead 100C includes a face plate 200C and a rear plate 300C. The exterior surface of the face plate 200C includes an image region 210C and aperture region 220C on different adjacent planes sharing a common line forming an angle. The interior surface of the rear plate 300C may mirror the angled or bent exterior surface of the face plate 200C.

Figure 10:
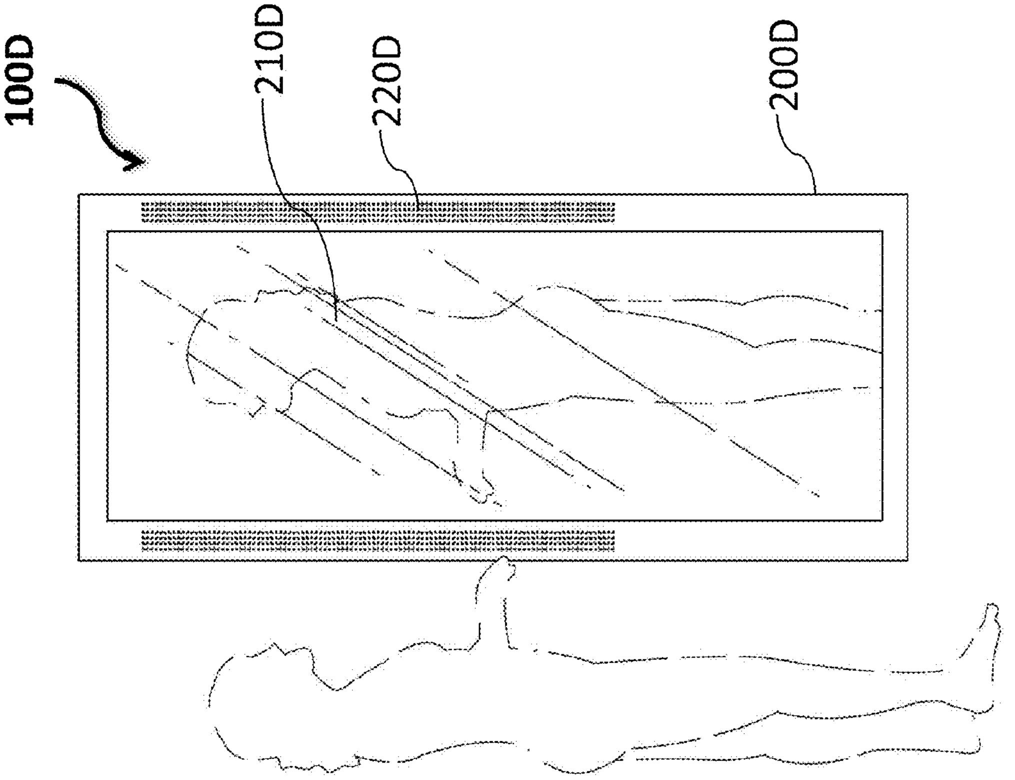
FIG. 10 shows an exemplary showerhead apparatus with a face plate having a frame in which two aperture regions are positioned around the image region.

FIG. 10 shows an exemplary showerhead apparatus with a face plate having a frame in which two aperture regions are positioned around the image region. The showerhead apparatus 100D includes a faceplate 200D that has a frame which two aperture regions 220D are positioned on opposing sides of the image region 210D.

As can be appreciated from the foregoing description, the fluid entering the apparatus 100D may be first directed toward the image region 210D to substantially mitigate condensation thereon.

Figure 11:
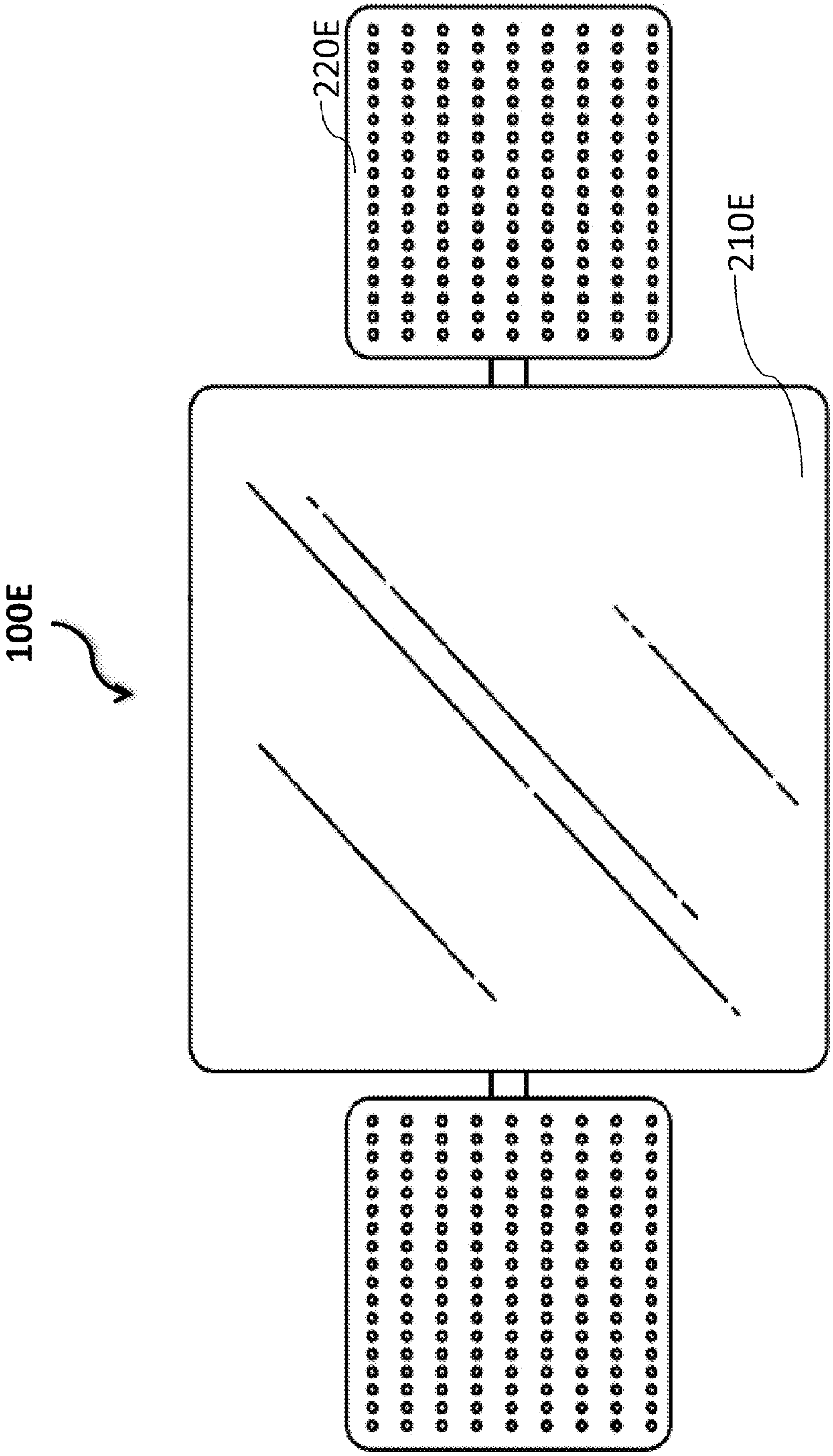
FIG. 11 shows an exemplary showerhead apparatus that has two aperture regions and an image region.

FIG. 11 shows an exemplary showerhead apparatus that has two aperture regions and an image region. The showerhead apparatus 100E may be supported by a shower arm (e.g., swivel) configuration substantially as described with reference for example to FIG. 1, except that the aperture region is implemented on two independently rotatable housings on opposite sides of a central housing that includes an image region 210E. When fluid is supplied to the showerhead apparatus, the fluid makes contact with the image region 210E before being distributed laterally to the aperture regions 220E. The showerhead apparatus is adjustable so a user may independently adjust the angle of reflection of the image region 210E with respect to a horizontal plane. The user may independently manipulate or adjust the positions of either or both of the aperture regions 220E relative to each other or to the image region 210E. Each of the aperture regions 220E may be adjustable without adjusting the image region 210E to control the position of the fluid streams while maintaining the position of the image region 210E.

Figure 12:
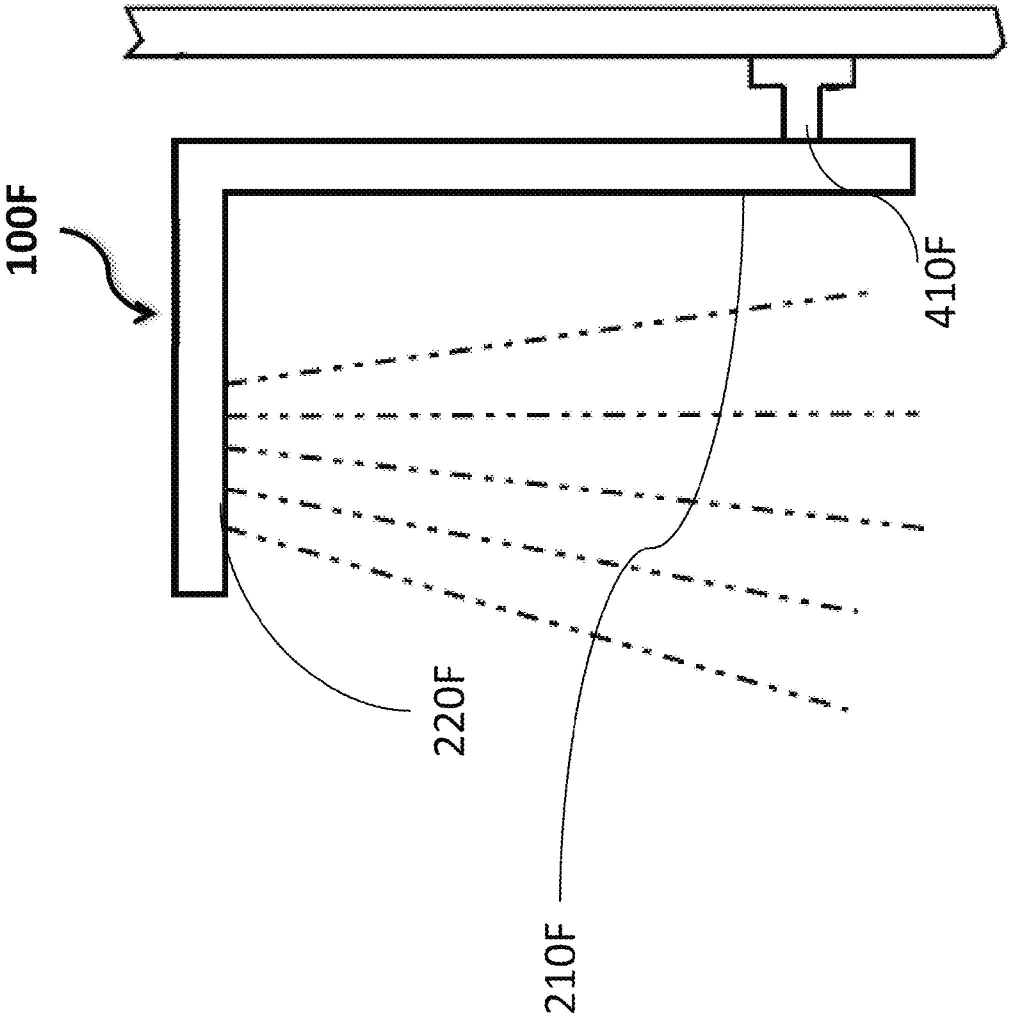
FIG. 12 shows an exemplary showerhead apparatus in which the aperture region provides an overhead outlet of fluid.

FIG. 12 shows an exemplary showerhead apparatus in which the aperture region provides an overhead outlet of fluid. In this "rain shower" configuration of water outflow, the flow of water exits substantially perpendicular to the ground. The profile of the showerhead apparatus is generally L-shaped. The showerhead apparatus 100F includes a housing that defines a cavity. The housing has a bend of approximately 90 degrees in which the image region 210F and aperture region 220F are positioned on different planes joined by the bend. Fluid is supplied to the showerhead apparatus 100F through an inlet port 410F and makes thermal contact with the interior surface of the housing corresponding to the position of image region 210F for efficient heat transfer from the fluid to the image region 210F. The fluid fills the cavity and eventually exits the aperture region 220F. This configuration affords the image region 210F substantial thermal contact with the fluid before being dispensed through the apertures in the aperture region 220F.

Although a number of embodiments have been described with reference to the figures, other examples are possible. For example, a showerhead apparatus with an image region and an aperture region may include a single elongated slot that provides an aperture size substantially similar to an aggregate aperture size of an array of apertures. In some examples, the slot-style aperture may dispense a substantially horizontal flow, which may resemble a water-fall.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A showerhead apparatus comprising:

a housing having a housing wall, the housing defining a substantially enclosed cavity;

an inlet port arranged to couple to a pressurized source of fluid, wherein the inlet provides fluid communication between the pressurized source and the cavity when the inlet is coupled to the pressurized source; and, a face plate forming a portion of the housing, the face plate comprising:

i) at least one image region that includes a substantially reflective exterior surface; and, ii) at least one aperture region, each of which includes one or more apertures that form a corresponding plurality of fluid streams when a pressurized fluid is present in the cavity, wherein the housing is configured to direct a fluid stream into the cavity from the inlet port to make thermal contact with the at least one image region before making thermal contact with the at least one aperture region, wherein the plurality of fluid streams are directed substantially orthogonal to the face plate and towards a portion of an object while the portion of the object is simultaneously reflected in the image region.

2. The showerhead apparatus of claim 1, wherein the inlet port couples to a conduit for receiving fluid from the pressurized source.

3. The showerhead apparatus of claim 1, wherein the at least one image region reflects an image of an object at a position in a substantially horizontal plane that is substantially parallel to at least one of the plurality of streams of fluid.

4. The showerhead apparatus of claim 1, further comprising an adjustable fixture for adjusting the position of the face plate, wherein the at least one image region of the face plate is adjustable to different positions for different viewing angles, and wherein the at least one aperture region is adjustable to different positions for controlling the path of the fluid streams.

5. The showerhead apparatus of claim 4, wherein the adjustable fixture is a swivel ball type connection.

6. The showerhead apparatus of claim 1 wherein ratio of a thickness of the housing wall in the image region to a thickness of the housing wall in the aperture region is between about 0.2 to 1 and about 0.95 to 1.

7. The showerhead apparatus of claim 1 wherein a ratio of a thickness of the housing wall in the image region to a thickness of the housing wall in the aperture region is between about 0.4 to 1 and about 0.7 to 1.

8. The showerhead apparatus of claim 1, further comprising a baffle positioned within the cavity, wherein one end of the baffle is positioned near the inlet port and the other end is directed toward the at least one image region to direct fluid flow into the cavity toward the at least one image region.

9. The showerhead apparatus of claim 1, wherein the inlet port is angled toward the at least one image region to direct fluid flow into the cavity toward the at least one image region.

10. The showerhead apparatus of claim 1, wherein the combined cross sectional area of the one or more apertures of the at least one aperture region is less than the cross sectional area of the inlet port.

11. The showerhead apparatus of claim 1, wherein reflective surface is made from brass.

12. The showerhead apparatus of claim 1, wherein the image region has a concave curvature.

13. The showerhead apparatus of claim 1, wherein the exterior image region has a convex curvature.

14. The showerhead apparatus of claim 1, further comprising at least one duct that provides fluid communication between the at least one image region and the at least one aperture region.

15. A method comprising:

providing a housing having a housing wall, the housing defines a substantially enclosed cavity;

providing an inlet port that is arranged to couple to a pressurized source of fluid, wherein the inlet provides fluid communication between the pressurized source and the cavity when the inlet is coupled to the pressurized source;

providing a face plate that forms a portion of the housing, the face plate comprising:

i) at least one image region that includes a substantially reflective exterior surface; and, ii) at least one aperture region, each of which includes a plurality of apertures that form a corresponding plurality of fluid streams when a pressurized fluid is present in the cavity;

directing a fluid stream into the cavity from the inlet port to make thermal contact with the at least one image region before flowing to the at least one aperture region; and directing the plurality of fluid streams substantially orthogonal to the face plate and towards a portion of an object while the portion of the object is simultaneously reflected in the image region.

16. The method of claim 15, further comprising providing a rear plate, wherein the rear plate and the face plate are attached to form the housing.

17. The method of claim 15, further comprising providing a baffle positioned within the cavity, wherein one end of the baffle is positioned near the inlet port and the other end is directed toward the at least one image region.

18. The method of claim 15, wherein the inlet port is angled toward the at least one image region to direct fluid flow into the cavity toward the at least one image region.

19. The method of claim 15, wherein the combined cross sectional area of the apertures of the at least one aperture region is less than the cross sectional area of the inlet port.

20. The method of claim 15, wherein a ratio of a thickness of the housing wall in the image region to a thickness of the housing wall in the aperture region is between about 0.4 to 1 and about 0.7 to 1.

* * * * *